C. Kittinger,
Wood Clamp.
No. 2,856.    Patented Nov. 21, 1842.
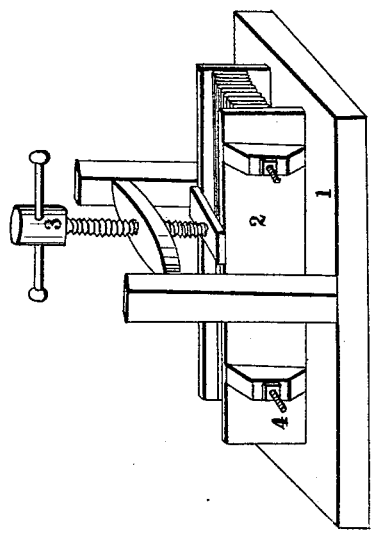

UNITED STATES PATENT OFFICE.

CASPER KITTINGER, OF EAST GREENVILLE, OHIO, ASSIGNOR TO WM. IBA.

MACHINE FOR VENEERING CURVED SURFACES.

Specification of Letters Patent No. 2,856, dated November 21, 1842.

*To all whom it may concern:*

Be it known that I, CASPER KITTINGER, of East Greenville, in Stark county, Ohio, have invented a new and useful Machine for Veneering, called a "Veneering-Machine;" and I do hereby declare that the following is a full, clear, and exact description of the construction and operation of the same, reference being had to the annexed drawings, making a part of this specification, in which—

Figure 1 is a perspective view of the machine, Fig. 2 is the block, Fig. 3 is a large screw on the top of the machine, Fig. 4 is a smaller screw passing through the block, Fig. 5 represents the slats of the block, and Fig. 6 represents mortises in said slats.

The machine is constructed of wood, and consists of a plank from ten to thirty inches wide and may be made any convenient length, say from one to five feet, and any thickness from one to five inches, into the upper side of which plank near the edges there are two, four, or any other even number of posts framed with beams extending across the plank from one post to the other near the tops of the posts, in or through the center of which beams the large screw, Fig. 3, passes on the block so as to press it upon the veneer which is placed under the block.

This machine resembles in form and appearance a common screw press.

The block consists of two pieces of plank as represented by Fig. 2, about two inches thick and from three to eight inches wide and as long as the bottom part of the machine or shorter if more convenient, and are fastened together by means of one or more iron or wooden screws from a half to an inch in diameter and from six inches to two feet long, with a common bur or nut on either end of the screws, as represented by Fig. 4, for the purpose of screwing the planks nearer to each other or farther apart in the form of a clamp. Between those pieces of plank there are a number of slats which may be made from an eighth to a half an inch thick, rounded on the edges, and about two inches narrower than the plank, but the same length, as represented by Fig. 5. Near the ends of those slats there are mortises as represented by Fig. 6, running lengthwise across the slats, through which the last mentioned screws pass, which forms what is above termed the block. When the block is raised from the bottom of the machine for the purpose of placing under it whatever is designed to be veneered, the screws which keep the slats together in the block are slacked by which means the slats adjust themselves to whatever form of molding it may be desired to veneer. The screws which pass through the slats keep them to their proper place, and the mortises are for the purpose of either raising or lowering the slats to suit the molding or surface to be veneered.

When the veneer is placed under the block and every thing else properly adjusted the screws which pass through the block are then screwed tight, and the block is then screwed down upon the veneer by means of the screw or screws of the machine as represented by Fig. 3.

What I claim as my invention and desire to secure by Letters Patent is—

The methods of forming a bed on which to veneer curved surfaces by means of slats provided with slots through which clamp screws pass to secure them in any position by which the operator can adopt them to any desired curve, for the purpose and in the manner substantially as herein described.

CASPER KITTINGER.

Witnesses:
VALENTINE BOLIN,
LEVI KITTINGER.